US006557098B2

(12) United States Patent
Oberman et al.

(10) Patent No.: US 6,557,098 B2
(45) Date of Patent: *Apr. 29, 2003

(54) MICROPROCESSOR INCLUDING AN EFFICIENT IMPLEMENTATION OF EXTREME VALUE INSTRUCTIONS

(75) Inventors: Stuart Oberman, Sunnyvale, CA (US); Norbert Juffa, San Jose, CA (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/478,139

(22) Filed: Jan. 5, 2000

(65) Prior Publication Data

US 2001/0054140 A1 Dec. 20, 2001

Related U.S. Application Data

(63) Continuation of application No. 08/948,679, filed on Oct. 10, 1997, now Pat. No. 6,029,244.
(60) Provisional application No. 60/063,601, filed on Oct. 23, 1997.

(51) Int. Cl.[7] .............................................. G06F 9/305
(52) U.S. Cl. ....................................................... 712/223
(58) Field of Search ................................. 712/223, 208

(56) References Cited

U.S. PATENT DOCUMENTS 4,967,349 A * 10/1990 Kodama et al. ............... 712/35
5,515,306 A      5/1996 Blaner et al. ................ 708/207

(List continued on next page.)

FOREIGN PATENT DOCUMENTS

EP    0 463 975    1/1992
EP    0 678 808    10/1995
WO    96/17292    6/1996

OTHER PUBLICATIONS

IBM Technical Disclosure, "ALU Implementing Native Minimum/Maximum Function for Signal Processing Applications," vol. 29, No. 5, Oct. 1986.

*Primary Examiner*—David Y. Eng
(74) *Attorney, Agent, or Firm*—Meyertons, Hood, Kivlin, Kowert & Goetzel, P.C.; B. Noël Kivlin

(57) ABSTRACT

An execution unit is provided for executing a first instruction which includes an opcode field, a first operand field, and a second operand field. The execution unit includes a first input register for receiving a first operand specified by a value of the first operand field, and a second input register for receiving a second operand specified by a value of the second operand field. The execution unit further includes a comparator unit which is coupled to receive a value of the opcode field for the first instruction. The comparator unit is also coupled to receive the first and second operand values from the first and second input registers, respectively. The execution further includes a multiplexer which receives a plurality of inputs. These inputs include a first constant value, a second constant value, and the values of the first and second operand. If the decoded opcode value received by the comparator indicates that the first instruction is either a compare or extreme value function, the comparator conveys one or more control signals to the multiplexer for the purpose of selecting an output of the multiplexer as the result of the first instruction. If the first instruction is one of a plurality of extreme value instructions, the one or more control signals conveyed by the comparator unit select between the first operand and second operand to determine the result of the first instruction. If the first instruction is one of a plurality of compare instructions, the one or more control signals conveyed by the comparator unit select between the first and second constant value to determine the result of the first instruction. In another embodiment, a similar execution unit is provided which handles vector operands.

20 Claims, 9 Drawing Sheets

U.S. PATENT DOCUMENTS

| | | |
|---|---|---|
| 5,560,032 A | 9/1996 | Nguyen et al. ............... 712/23 |
| 5,590,365 A * | 12/1996 | Ide et al. .................... 712/218 |
| 5,715,186 A | 2/1998 | Curtet ........................ 708/207 |
| 5,867,683 A | 2/1999 | Witt et al. .................. 712/218 |
| 6,185,670 B1 * | 2/2001 | Huff et al. .................. 712/208 |

* cited by examiner

PFMIN                                    100

| mnemonic | opcode/imm8 | description |
|---|---|---|
| PFMIN mmreg1, mmreg2/mem64 | 0Fh 0Fh / 94h | Packed floating-point minimum |

IF (mmreg1[31:0]<mmreg2/mem64[31:0])
    THEN mmreg1[31:0]=mmreg1[31:0]
ELSE mmreg1[31:0]=mmreg2/mem64[31:0]
IF (mmreg1[63:32]<mmreg2/mem64[63:32])
    THEN mmreg1[63:32]=mmreg1[63:32]
ELSE mmreg1[63:32]=mmreg2/mem64[63:32]

FIG. 2B

| PFMIN | | Source 2 | | |
|---|---|---|---|---|
| | | 0 | Normal | Unsupported |
| Source 1 & Destination | 0 | +0 | Source 2, +0* | Undefined |
| | Normal | Source 1, +0** | Source 1/Source 2 *** | Undefined |
| | Unsupported | Undefined | Undefined | Undefined |

Notes:
*    The result is source 2 if source 2 is negative otherwise the result is positive zero.
**   The result is source 1 if source 1 is negative otherwise the result is positive zero.
*** The result is source 1 if source 1 is negative and source 2 is positive. The result is source 1 if both are negative and source 1 is greater in magnitude than source 2. The result is source 1 if both are positive and source 1 is lesser in magnitude than source 2. The result is source 2 in all other cases.

FIG. 2C

PFMAX                              200

| mnemonic | opcode/imm8 | description |
|---|---|---|
| PFMAX mmreg1, mmreg2/mem64 | 0Fh 0Fh / A4h | Packed floating-point minimum |

IF (mmreg1[31:0]>mmreg2/mem64[31:0])
   THEN mmreg1[31:0]=mmreg1[31:0]
ELSE mmreg1[31:0]=mmreg2/mem64[31:0]
IF (mmreg1[63:32]>mmreg2/mem64[63:32])
   THEN mmreg1[63:32]=mmreg1[63:32]
ELSE mmreg1[63:32]=mmreg2/mem64[63:32]

FIG. 3B

| PFMAX | Source 2 | | | |
|---|---|---|---|---|
| | | 0 | Normal | Unsupported |
| Source 1 & Destination | 0 | +0 | Source 2, +0* | Undefined |
| | Normal | Source 1, +0** | Source 1/Source 2 *** | Undefined |
| | Unsupported | Undefined | Undefined | Undefined |

Notes:
\*   The result is source 2 if source 2 is positive otherwise the result is positive zero.
\*\*  The result is source 1 if source 1 is positive otherwise the result is positive zero.
\*\*\* The result is source 1 if source 1 is positive and source 2 is negative. The result is source 1 if both are positive and source 1 is greater in magnitude than source 2. The result is source 1 if both are negative and source 1 is lesser in magnitude than source 2. The result is source 2 in all other cases.

FIG. 3C

PFCMPEQ                                          300

| mnemonic | opcode/imm8 | description |
|---|---|---|
| PFCMPEQ mmreg1, mmreg2/mem64 | 0Fh 0Fh / B0h | Packed floating-point comparison, equal |

```
IF (mmreg1[31:0]=mmreg2/mem64[31:0])
   THEN mmreg1[31:0]=FFFF_FFFFh
ELSE mmreg1[31:0]=0000_0000h
   IF (mmreg1[63:32]=mmreg2/mem64[63:32])
      THEN mmreg1[63:32]=FFFF_FFFFh
ELSE mmreg1[63:32]=0000_0000h
```

FIG. 4B

| PFCMPEQ | Source 2 | | | |
|---|---|---|---|---|
| | | 0 | Normal | Unsupported |
| Source 1 & Destination | 0 | FFFF_FFFFh* | 0000_0000h | 0000_0000h |
| | Normal | 0000_0000h | 0000_0000h, FFFF_FFFFh** | 0000_0000h |
| | Unsupported | 0000_0000h | 0000_0000h | Undefined |

Notes:
\*   Positive zero is equal to negative zero.
\*\*   The result is FFFF_FFFFh if source 1 and source 2 have identical signs, exponents, and mantissas: It is 0000_0000h otherwise.

FIG. 4C

PFCMPGT                                       400

| mnemonic | opcode/imm8 | description |
| --- | --- | --- |
| PFCMPGT mmreg1, mmreg2/mem64 | 0Fh 0Fh / A0h | Packed floating-point comparison, greater |

IF (mmreg1[31:0]>mmreg2/mem64[31:0])
   THEN mmreg1[31:0]=FFFF_FFFFh
ELSE mmreg1[31:0]=0000_0000h
 IF (mmreg1[63:32]>mmreg2/mem64[63:32])
   THEN mmreg1[63:32]=FFFF_FFFFh
ELSE mmreg1[63:32]=0000_0000h

FIG. 5B

| PFCMPGT | Source 2 | | | |
| --- | --- | --- | --- | --- |
| | | 0 | Normal | Unsupported |
| Source 1 & Destination | 0 | 0000_0000h | 0000_0000h, FFFF_FFFFh* | Undefined |
| | Normal | 0000_0000h, FFFF_FFFF** | 0000_0000h FFFF_FFFFh*** | Undefined |
| | Unsupported | Undefined | Undefined | Undefined |
| Notes: <br> *   The result is FFFF_FFFFh if source 2 is negative, otherwise the result is 0000_0000h. <br> **  The result is FFFF_FFFFh if source 1 is positive, otherwise the result is 0000_0000h. <br> *** The result is FFFF_FFFFh if source 1 is positive and source 2 is negative, or if they are both negative and source 1 is smaller in magnitude than source 2, or if source 1 and source 2 are positive and source 1 is greater in magnitude than source 2. The result is 0000_0000h in all other cases. | | | | |

FIG. 5C

PFCMPGE          500

| mnemonic | opcode/imm8 | description |
|---|---|---|
| PCMPGE mmreg1, mmreg2/mem64 | 0Fh 0Fh / 90h | Packed floating-point comparison, greater or equal |

IF (mmreg1[31:0]>=mmreg2/mem64[31:0])
    THEN mmreg1[31:0]=FFFF_FFFFh
ELSE mmreg1[31:0]=0000_0000h
IF (mmreg1[63:32]>=mmreg2/mem64[63:32])
    THEN mmreg1[63:32]=FFFF_FFFFh
ELSE mmreg1[63:32]=0000_0000h

FIG. 6B

| PFCMPGE | Source 2 | | | |
|---|---|---|---|---|
| Source 1 & Destination | | 0 | Normal | Unsupported |
| | 0 | FFFF_FFFFh* | 0000_0000h, FFFF_FFFFh** | Undefined |
| | Normal | 0000_0000h, FFFF_FFFF*** | 0000_0000h, FFFF_FFFFh**** | Undefined |
| | Unsupported | Undefined | Undefined | Undefined |

Notes:
\*     Positive zero is equal to negative zero.
\*\*    The result is FFFF_FFFFh if source 2 is negative, otherwise the result is 0000_0000h.
\*\*\*   The result is FFFF_FFFFh if source 1 is positive, otherwise the result is 0000_0000h.
\*\*\*\* The result is FFFF_FFFFh if source 1 is positive and source 2 is negative, or if they are both negative and source 1 is smaller or equal in magnitude than source 2, or if source 1 and source 2 are both positive and source 1 is greater or equal in magnitude than source 2. The result is 0000_0000h in all other cases.

FIG. 6C

MICROPROCESSOR INCLUDING AN EFFICIENT IMPLEMENTATION OF EXTREME VALUE INSTRUCTIONS

This application is a continuation application of U.S. patent application Ser. No. 08/948,679, entitled "Microprocessor Including an Efficient Implementation of Extreme Value Instructions", filed Oct. 10, 1997, now U.S. Pat. No. 6,029,244, which claims the benefit of U.S. Provisional Application No. 60/063,601, filed Oct. 23, 1997.

FIELD OF THE INVENTION

This invention relates to computer systems and microprocessors, and more particularly to a multimedia execution unit incorporated within a microprocessor for accommodating high-speed multimedia applications. The invention further relates to extreme value functions and vector processing implemented within microprocessor based systems.

DESCRIPTION OF THE RELATED ART

Microprocessors typically achieve increased performance by partitioning processing tasks into multiple pipeline stages. In this manner, microprocessors may independently be executing various portions of multiple instructions during a single clock cycle. As used herein, the term "clock cycle" refers to an interval of time during which the pipeline stages of a microprocessor perform their intended functions. At the end of the clock cycle, the resulting values are moved to the next pipeline stage.

Microprocessor based computer systems have historically been used primarily for business applications, including word processing and spreadsheets, among others. Increasingly, however, computer systems have evolved toward the use of more real-time applications, including multimedia applications such as video and audio processing, video capture and playback, telephony and speech recognition. Since these multimedia applications are computational intensive, various enhancements have been implemented within microprocessors to improve multimedia performance. For example, some general purpose microprocessors have been enhanced with multimedia execution units configured to execute certain special instructions particularly tailored for multimedia computations. These instructions are often implemented as "vectored" instructions wherein operands for the instructions are partitioned into separate sections or vectors which are independently operated upon in accordance with the instruction definition. For example, a vectored add instruction may include a pair of 32-bit operands, each of which is partitioned into four 8-bit sections. Upon execution of such a vectored add instruction, corresponding 8-bit sections of each operand are independently and concurrently added to obtain four separate and independent addition results. Implementation of such vectored instructions in a computer system furthers the use of parallelism, and typically leads to increased performance for certain applications.

One type of commonly employed function in multimedia applications is a compare function. A compare function is typically implemented though the execution of a compare instruction which compares the value of one operand against another to determine whether the value of the first is greater than, equal to, or less than the other. A compare instruction may be treated as a vectored instruction wherein corresponding sections of associated operands are compared independently of other sections of the operands.

Another set of functions commonly utilized in multimedia processing are the extreme value functions. As used herein, "extreme value functions" are those functions which return either a minimum value selected among a plurality of values, or a maximum value selected among a plurality of values as a result of the function. In typical multimedia systems, a minimum value or a maximum value is obtained through the execution of several sequentially executed instructions. For example, a compare instruction may first be executed to determine the relative magnitudes of a pair of operand values, and subsequently a conditional branch instruction may be executed to determine whether a move operation must be performed to move the extreme value to a destination register or other storage location. These sequences of commands are common in multimedia applications, such as clipping algorithms in graphics rendering systems. Since extreme value functions are implemented through the execution of multiple instructions, however, a relatively large amount of processing time may be consumed by such operations.

It would therefore be desirable to provide a multimedia execution unit in a microprocessor which is capable of obtaining an extreme value through the execution of a single instruction. It would further be desirable to provide a multimedia execution unit with an efficient hardware implementation of the extreme value instructions.

SUMMARY OF THE INVENTION

The problems outlined above are in large part solved by an execution unit in accordance with the present invention. In one embodiment, an execution unit is provided for executing a first instruction which includes an opcode field, a first operand field, and a second operand field. The execution unit includes a first input register for receiving a first operand specified by a value of the first operand field, and a second input register for receiving a second operand specified by a value of the second operand field. The execution unit further includes a comparator unit which is coupled to receive a value of the opcode field for the first instruction. The comparator unit is also coupled to receive the first and second operand values from the first and second input registers, respectively. The execution further includes a multiplexer which receives a plurality of inputs. These inputs include a first constant value, a second constant value, and the values of the first and second operands. If the decoded opcode value received by the comparator indicates that the first instruction is either a compare or extreme value function, the comparator conveys one or more control signals to the multiplexer for the purpose of selecting an ouput of the multiplexer as the result of the first instruction. If the first instruction is one of a plurality of extreme value instructions, the one or more control signals conveyed by the comparator unit select between the first operand and second operand to determine the result of the first instruction. If the first instruction is one of a plurality of compare instructions, the one or more control signals conveyed by the comparator unit select between the first and second constant value to determine the result of the first instruction. In the case of the compare instructions, the value of the first and second constants may be advantageously chosen in order to form a mask for use by subsequent instructions. In another embodiment, a similar execution unit is provided which handles vector operands.

The extreme value functions are thus implemented in a single instruction. This advantageously results in improved performance for these instruction, which are particularly important in multimedia applications. An efficient hardware implementation is also achieved as the circuitry used for the extreme value operations is also shared by a plurality of compare operations.

Broadly speaking, the present invention contemplates a microprocessor configured to execute a first instruction, wherein an encoded representation of said first instruction includes an opcode field, a first operand field, and a second operand field. The microprocessor comprises an execution unit coupled to receive a decoded value of the opcode field, a first operand specified by a value of the first operand field, and a second operand specified by a value of the second operand field, wherein the execution unit is configured to perform an extreme value operation on the first operand and the second operand in response to receiving the decoded value of the opcode field. The execution unit is further configured to convey an output value of the extreme value operation as a result of the first instruction.

The present invention further contemplates an execution unit in a microprocessor for executing a first instruction, wherein an encoded representation of the first instruction includes an opcode field, a first operand field, and a second operand field. The execution unit comprises a first input register coupled to receive a first operand specified by a value of the first operand field and a second input register coupled to receive a second operand specified by a value of the second operand field. The execution further comprises a comparator unit coupled to receive the first operand from the first input register and the second operand from the second input register. The comparator unit is coupled to receive a decoded opcode value of the opcode field on a decoded opcode bus. Still further, the execution unit comprises a multiplexer coupled to receive a plurality of inputs including the first operand from the first input register, the second operand from the second input register, a first constant value, and a second constant value. The multiplexer is configured to select one of the plurality, of inputs to be conveyed as a result of the first instruction in response to receiving one or more control signals from the comparator unit. The comparator unit is configured to generate the one or more control signals in response to receiving the decoded opcode value, and, if the decoded opcode value indicates that the first instruction is one of a plurality of extreme value instructions, the one or more control signals are usable to select either the first operand or the second operand as the output value. If the decoded opcode value indicates that the first instruction is one of a plurality of compare instructions, the one or more control signals are usable to select either the first constant value or the second constant value as the output value.

The present invention still further contemplates an execution unit in a microprocessor for executing a first instruction, wherein an encoded representation of the first instruction includes an opcode field, a first operand field, and a second operand field. The execution unit comprises a first input register coupled to receive a first operand specified by a value of the first operand field, wherein the first operand includes a first vector value followed by a second vector value, as well as a second input register coupled to receive a second operand specified by a value of the second operand field, wherein the second operand includes a third vector value followed by a fourth vector value. The execution unit further comprises a comparator unit coupled to receive the first operand from the first input register and the second operand from the second input register. The comparator unit is coupled to receive a decoded opcode value of the opcode field on a decoded opcode bus. Additionally, the execution unit comprises a first multiplexer coupled to receive a first plurality of inputs including the first vector value from the first input register, the third vector value from the second input register, a first constant value, and a second constant value. The first multiplexer is configured to select one of the first plurality of inputs to be conveyed as a first portion of a vector result of the first instruction in response to receiving a first set of control signal values from the comparator unit. The comparator unit is further configured to generate the first set of control signal values in response to receiving the decoded opcode value. If the decoded opcode value indicates that the first instruction is one of a plurality of extreme value instructions, the first set of control signal values are usable to select either the first vector value or the third vector value as the first portion of the vector result. If the decoded opcode value indicates that the first instruction is one of a plurality of compare instructions, the first set of control signal values are usable to select either the first constant value or the second constant value as the first portion of the vector result.

The present invention additionally contemplates a method for executing a first instruction within an execution unit of a microprocessor, wherein an encoded representation of the first instruction includes an opcode field, a first operand field, and a second operand field. The method comprises conveying a first plurality of inputs to a comparator unit within the execution unit, wherein the first plurality of inputs includes a first operand specified by a value of the first operand field, a second operand specified by a value of the second operand field, and a decoded opcode value which corresponds to an encoded opcode value of the opcode field. The method further comprises conveying a second plurality of inputs to a multiplexer within the execution unit, wherein the second plurality of inputs includes the first operand, the second operand, a first constant value, and a second constant value. Still further, the method comprises generating a set of control signal values from the comparator unit in response to receiving the first plurality of inputs. The method next comprises conveying one of the second plurality of inputs from the multiplexer as a result of the first instruction in response to receiving the set of control signal values. The result is selected from the first operand and the second operand according to the set of control signal values if the decoded opcode value indicates that the first instruction corresponds to one of a plurality of extreme value instructions. The result is selected from the first constant value and the second constant value according to the set of control signal values if the decoded opcode value indicates that the first instruction corresponds to one of a plurality of compare instructions.

Finally, the present invention contemplates a microprocessor configured to execute a first instruction. The microprocessor comprises an instruction cache configured to store an encoded representation of the first instruction, wherein the encoded representation includes an opcode field, a first operand field, and a second operand field. The microprocessor further comprises a decode unit coupled to receive the encoded representation of the first instruction from the instruction cache, wherein the decode unit is configured to generate a decoded opcode value in response to receiving a value of the op code field. The microprocessor still further comprises an execution unit coupled to the decode unit, wherein the decode unit is further configured to cause a first operand and a second operand to be conveyed to the execution unit. The first operand is specified by a value of the first operand field, while the second operand is specified by a value of the second operand field.

The execution unit includes a first input register coupled to receive a first operand specified by a value of the first operand field, as well as a second input register coupled to receive a second operand specified by a value of the second operand field. The execution unit further includes a comparator unit coupled to receive the first operand from the first input register and the second operand from the second input register, The comparator unit is further coupled to receive a decoded opcode value of the opcode field on a decoded opcode bus. The execution unit still further includes a multiplexer coupled to receive a plurality of inputs including the first operand from the first input register, the second operand from the second input register, a first constant value, and a second constant value. The multiplexer is configured to select one of the plurality of inputs to be conveyed as a result of the first instruction in response to receiving a control signal value from the comparator unit. The comparator unit is configured to generate the control signal value in response to receiving the decoded opcode value. If the decoded opcode value indicates that the first instruction is one of a plurality of extreme value instructions, the control signal value is usable to select either the first operand or the second operand as the output value. If the decoded opcode value indicates that the first instruction is one of a plurality of compare instructions, the control signal is usable to select either the first constant value or the second constant value as the output value.

BRIEF DESCRIPTION OF THE DRAWINGS

Other objects and advantages of the invention will become apparent upon reading the following detailed description and upon reference to the accompanying drawings in which:

FIGS. 2A–C illustrate the format and operation of a minimum value instruction according to one embodiment of the invention;

FIGS. 3A–C illustrate the format and operation of a maximum value instruction according to one embodiment of the invention;

FIGS. 4A–C illustrate the format and operation of an equality compare instruction according to one embodiment of the invention;

FIGS. 5A–C illustrate the format and operation of a greater than compare instruction according to one embodiment of the invention;

FIGS. 6A–C illustrate the format of an greater than or equal to compare instruction according to one embodiment of the invention;

DETAILED DESCRIPTION OF THE INVENTION

Figure 1:
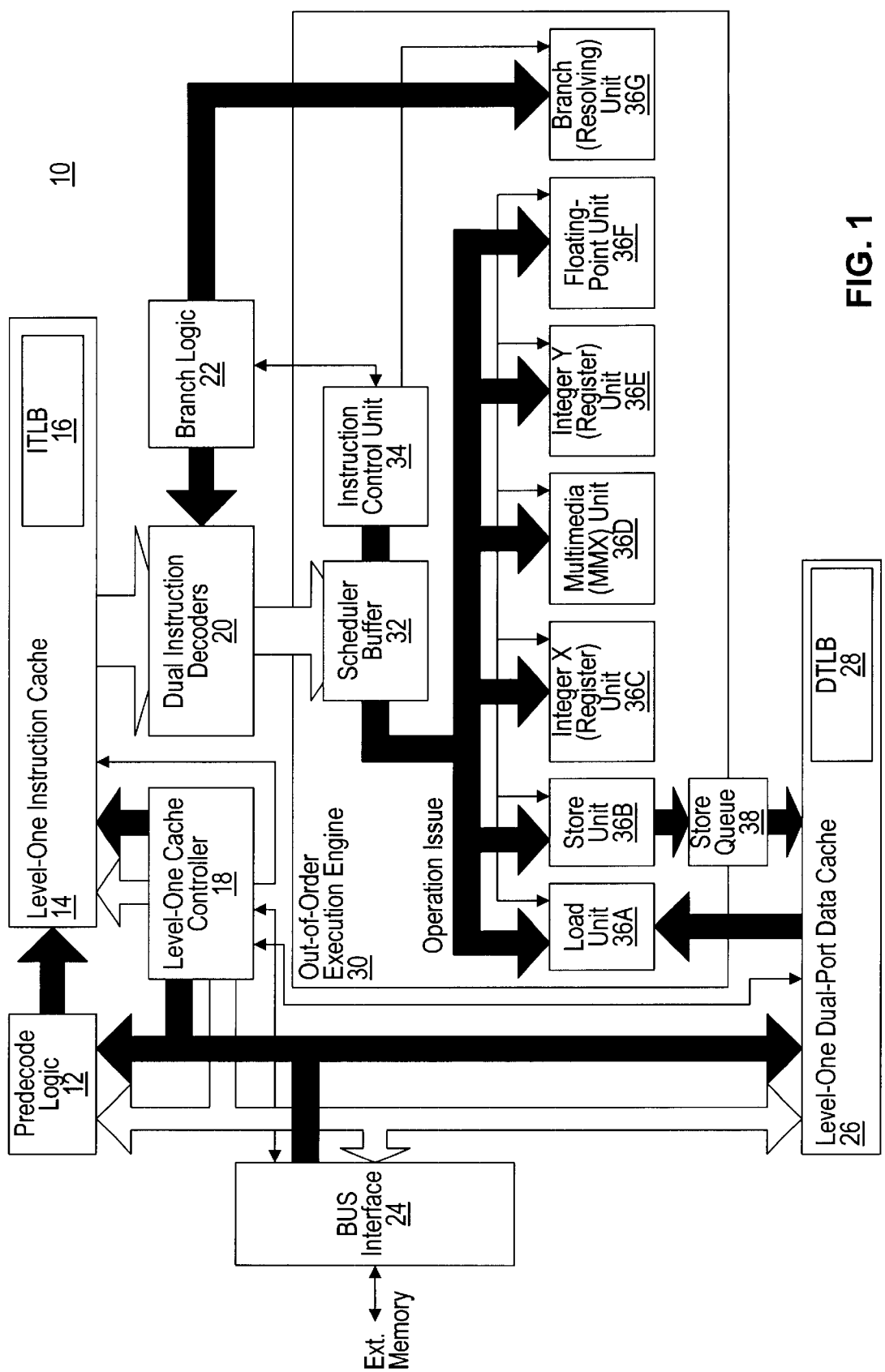
FIG. 1 is a block diagram of a microprocessor.

Turning now to FIG. 1, a block diagram of one embodiment of a microprocessor 10 is shown. As depicted, microprocessor 10 includes a predecode logic block 12 coupled to an instruction cache 14 (which includes an instruction TLB 16). A cache controller 18 is coupled to both predecode block 12 and instruction cache 14, as well as a bus interface unit 24 and a data cache 26 (which includes a data TLB 28). Microprocessor 10 further includes a decode unit 20, which receives instructions from instruction cache 14 which are forwarded to execution engine 30 in accordance with input received from a branch logic unit 22.

Execution engine 30 includes a scheduler buffer 32 coupled to receive input from decode unit 20. Scheduler buffer 32 is coupled to convey decoded instructions to a plurality of execution units 36A–G in accordance with input received from an instruction control unit 34. Execution units 36A–G include a load unit 36A, a store unit 36B, an integer X unit 36C, a multimedia unit 36D, an integer Y unit 36E, a floating point unit 36F, and a branch resolving unit 36G. Load unit 36A receives input from data cache 26, while store unit 36B interfaces with data cache 26 via a store queue 38. Blocks referred to herein with a reference number followed by a letter will be collectively referred to by the reference number alone. For example, execution units 36A–G will be collectively referred to as execution units 36.

Generally speaking, multimedia execution unit 36D within microprocessor 10 is configured to provide an efficient implementation for extreme value instructions. As will be described in greater detail below, execution unit 36D utilizes hardware which performs compare operations in order to also perform minimum and maximum value instructions. In this manner, execution unit 36D advantageously implements these extreme value instructions as dedicated, single-cycle, instructions, thereby increasing the performance of applications such as three-dimensional graphics rendering and audio processing.

In one embodiment, instruction cache 14 is organized as sectors, with each sector including two 32-byte cache lines. The two cache lines of a sector share a common tag but have separate state bits that track the status of the line. Accordingly, two forms of cache misses (and associated cache fills) may take place: sector replacement and cache line replacement. In the case of sector replacement, the miss is due to a tag mismatch in instruction cache 14, with the required cache line being supplied by external memory via bus interface unit 24. The cache line within the sector that is not needed is then marked invalid. In the case of a cache line replacement, the tag matches the requested address, but the line is marked as invalid. The required cache line is supplied by external memory, but, unlike the sector replacement case, the cache line within the sector that was not requested remains in the same state. In alternate embodiments, other organizations for instruction cache 14 may be utilized, as well as various replacement policies.

Microprocessor 10 performs prefetching only in the case of sector replacements in one embodiment. During sector replacement, the required cache line is filled. If this required cache line is in the first half of the sector, the other cache line in the sector is prefetched. If this required cache line is in the second half of the sector, no prefetching is performed. It is noted that other prefetching methodologies may be employed in different embodiments of microprocessor 10.

When cache lines of instruction data are retrieved from external memory by bus interface unit 24, this data is conveyed to predecode logic block 12. In one embodiment, the instructions processed by microprocessor 10 and stored in cache 14 are variable-length (e.g., the x86 instruction set). Because decode of variable-length instructions is particularly complex, predecode logic 12 is configured to provide additional information to be stored in instruction cache 14 to aid during decode. In one embodiment, predecode logic 12 generates predecode bits for each byte in instruction cache 14 which indicate the number of bytes to the start of the next variable-length instruction. These predecode bits are passed to decode unit 20 when instruction bytes are requested from cache 14.

Instruction cache 14 is implemented as a 32 Kbyte, two-way set associative, writeback cache in one embodiment of microprocessor 10. The cache line size is 32 bytes in this embodiment. Cache 14 also includes a 64-entry TLB used to translate linear addresses to physical addresses. Many other variations of instruction cache 14 are possible in other embodiments.

Instruction fetch addresses are supplied by cache controller 18 to instruction cache 14. In one embodiment, up to 16 bytes per clock cycle may be fetched from cache 14. The fetched information is placed into an instruction buffer that feeds into decode unit 20. In one embodiment of microprocessor 10, fetching may occur along a single execution stream with seven outstanding branches taken.

In one embodiment, the instruction fetch logic within cache controller 18 is capable of retrieving any 16 contiguous instruction bytes within a 32-byte boundary of cache 14. There is no additional penalty when the 16 bytes cross a cache line boundary. Instructions are loaded into the instruction buffer as the current instructions are consumed by decode unit 20. Other configurations of cache controller 18 are possible in other embodiments.

Decode logic 20 is configured to decode multiple instructions per processor clock cycle. In one embodiment, decode unit 20 accepts instruction and predecode bytes from the instruction buffer (in x86 format), locates actual instruction boundaries, and generates corresponding "RISC ops". RISC ops are fixed-format internal instructions, most of which are executable by microprocessor 10 in a single clock cycle. RISC ops are combined to form every function of the x86 instruction set in one embodiment of microprocessor 10.

Microprocessor 10 uses a combination of decoders to convert x86 instructions into RISC ops. The hardware includes three sets of decoders: two parallel short decoders, one long decoder, and one vectoring decoder. The parallel short decoders translate the most commonly-used x86 instructions (moves, shifts, branches, etc.) into zero, one, or two RISC ops each. The short decoders only operate on x86 instructions that are up to seven bytes long. In addition, they are configured to decode up to two x86 instructions per clock cycle. The commonly-used x86 instructions which are greater than seven bytes long, as well as those semi-commonly-used instructions are up to seven bytes long, are handled by the long decoder.

The long decoder in decode unit 20 only performs one decode per clock cycle, and generates up to four RISC ops. All other translations (complex instructions, interrupts, etc.) are handled by a combination of the vector decoder and RISC op sequences fetched from an on-chip ROM. For complex operations, the vector decoder logic provides the first set of RISC ops and an initial address to a sequence of further RISC ops. The RISC ops fetched from the on-chip ROM are of the same type that are generated by the hardware decoders.

In one embodiment, decode unit 20 generates a group of four RISC ops each clock cycle. For clock cycles in which four RISC ops cannot be generated, decode unit 20 places RISC NOP operations in the remaining slots of the grouping. These groupings of RISC ops (and possible NOPs) are then conveyed to scheduler buffer 32.

It is noted that in another embodiment, an instruction format other than x86 may be stored in instruction cache 14 and subsequently decoded by decode unit 20.

Instruction control logic 34 contains the logic necessary to manage out-of-order execution of instructions stored in scheduler buffer 32. Instruction control logic 34 also manages data forwarding, register renaming, simultaneous issue and retirement of RISC ops, and speculative execution. In one embodiment, scheduler buffer 32 holds up to 24 RISC ops at one time, equating to a maximum of 12 x86 instructions. When possible, instruction control logic 34 may simultaneously issue (from buffer 32) a RISC op to any available one of execution units 36. In total, control logic 34 may issue up to six and retire up to four RISC ops per clock cycle in one embodiment.

In one embodiment, microprocessor 10 includes seven execution units (36A–G). Store unit 36A and load unit 36B are two-staged pipelined designs. Store unit 36A performs data memory and register writes which are available for loading after one clock cycle. Load unit 36B performs memory reads. The data from these reads is available after two clock cycles. Load and store units are possible in other embodiments with varying latencies.

Execution unit 36C (Integer X unit) is a fixed point execution unit which is configured to operate on all ALU operations, as well as multiplies, divides (both signed and unsigned), shifts, and rotates. In contrast, execution unit 36E (Integer Y unit) is a fixed point execution unit which is configured to operate on the basic word and doubleword ALU operations (ADD, AND, CMP, etc.).

Execution unit 36D (multimedia unit) is configured to accelerate performance of software written using multimedia instructions. Applications that can take advantage of multimedia instructions include graphics, video and audio compression and decompression, speech recognition, and telephony. Execution unit 36D is configured to execute multimedia instructions in a single clock cycle in one embodiment. Many of these instructions are designed to perform the same operation of multiple sets of data at once (vector processing). In one embodiment, multimedia unit 36D uses registers which are mapped on to the stack of floating point unit 36F.

Execution unit 36F contains an IEEE 754-compatible floating point unit designed to accelerate the performance of software which utilizes the x86 instruction set. Floating point software is typically written to manipulate numbers that are either very large or small, require a great deal of precision, or result from complex mathematical operations such as transcendentals. Floating point unit includes an adder unit, a multiplier unit, and a divide/square root unit. In one embodiment these low-latency units are configured to execute floating point instructions in as few as two clock cycles.

Execution unit 36G (the branch resolving unit) is separate from branch prediction logic 22 in that it resolves conditional branches such as JCC and LOOP after the branch condition has been evaluated. Branch resolving unit 36G allows efficient speculative execution, enabling microprocessor 10 to execute instructions beyond conditional branches before knowing whether the branch prediction was correct. As described above, microprocessor 10 is configured to handle up to seven outstanding branches in one embodiment.

Branch prediction logic 22, coupled to decode unit 20, is configured to increase the accuracy with which conditional branches are predicted in microprocessor 10. Ten to twenty percent of the instructions in typical applications include conditional branches. Branch prediction logic 22 is configured to handle this type of program behavior and its negative effects on instruction execution, such as stalls due to delayed instruction fetching. In one embodiment, branch prediction logic 22 includes an 8192-entry branch history table, a 16-entry by 16 byte branch target cache, and a 16-entry return address stack.

Branch prediction logic 22 implements a two-level adaptive history algorithm using the branch history table. This table stores executed branch information, predicts individual branches, and predicts behavior of groups of branches. In one embodiment, the branch history table does not store predicted target addresses in order to save space. These addresses are instead calculated on-the-fly during the decode stage.

To avoid a clock cycle penalty for a cache fetch when a branch is predicted taken, a branch target cache within branch logic 22 supplies the first 16 bytes at that address directly to the instruction buffer (if a hit occurs in the branch target cache). In one embodiment, this branch prediction logic achieves branch prediction rates of over 95%.

Branch logic 22 also includes special circuitry designed to optimize the CALL and RET instructions. This circuitry allows the address of the next instruction following the CALL instruction in memory to be pushed onto a return address stack. When microprocessor 10 encounters a RET instruction, branch logic 22 pops this address from the return stack and begins fetching.

Like instruction cache 14, data cache 26 is also organized as two-way set associative 32 Kbyte storage. In one embodiment, data TLB 28 includes 128 entries used to translate linear to physical addresses. Like instruction cache 14, data cache 26 is also sectored. Data cache 26 implements a MESI (modified-exclusive-shared-invalid) protocol to track cache line status, although other variations are also possible.

Turning now to FIG. 2A, the format of a floating point minimum value instruction ("PFMIN") 100 is shown according to one embodiment of the invention. As depicted, PFMIN instruction 100 includes an opcode value 101 and two operands, first operand field 102A and first operand field 102B. The value specified by first operand field 102A is shown as being "mmreg1", which, in one embodiment, is one of the registers on the stack of floating point execution unit 36F. The value specified by second operand field 102B is shown as either being another of the floating point stack registers or a memory location. In another embodiment, second operand field 102B specifies an immediate value is an immediate value.

In one embodiment, instruction 100 (and other instructions to be described below with reference to FIGS. 3A, 4A, 5A, and 6A) specifies operands (such as the values specified by operand fields 102) having more than one independent value within a given register which is specified as an operand. That is, registers such as mmreg1 specified in FIG. 2A are vector registers.

Figure 7A:
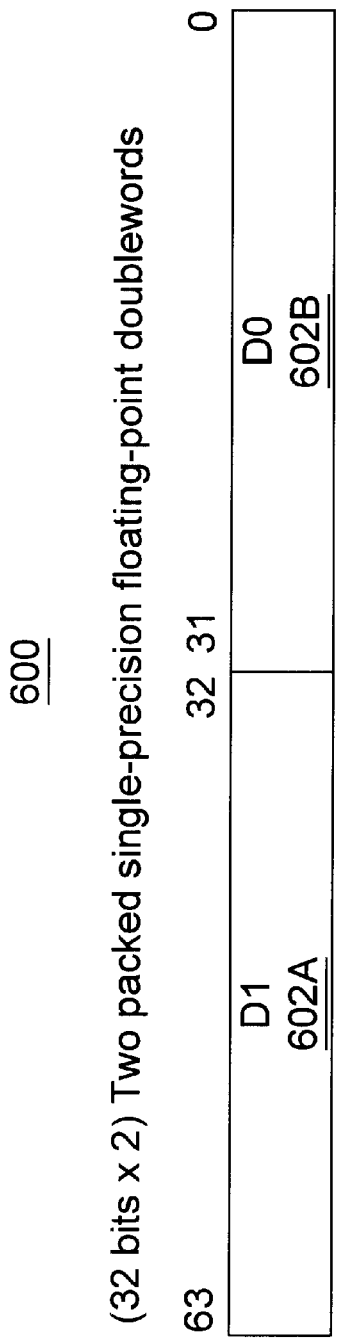
FIGS. 7A–B illustrate the format of the operands utilized by the instructions depicted in FIGS. 2–6 according to one embodiment of the invention.

The format of such a register 600 is shown in FIG. 7A. Register 600 includes two separate vector quantities, first vector value 602A and second vector value 602B. In one embodiment, all of the floating point registers in execution unit 36F which are accessible by instruction 100 and other instructions described herein are organized in a similar manner. Vector values 602 each include a 32-bit single-precision floating point in one embodiment. In other embodiments, vector values 602 may be stored in other numerical representations, such as a fixed point format.

Figure 7B:
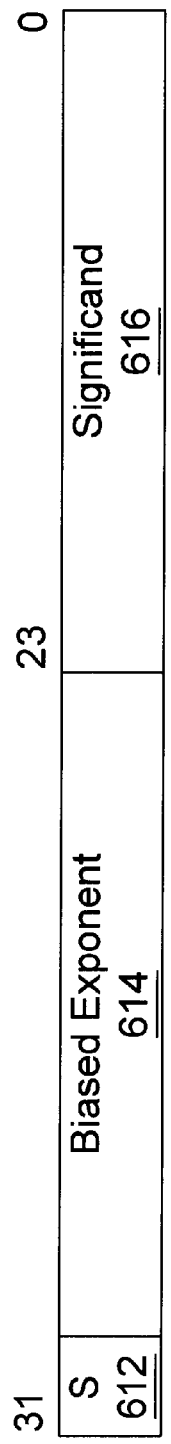

The format of the single-precision values stored in vector values 603 is depicted in FIG. 7B. As shown, format 610 (which corresponds to IEEE floating point format) includes a sign bit 612 (S), an exponent value 614 (E), and a significand value 616 (F). The value of a number V represented in format 610 can thus be represented by $$V=(-1)^{s}*2^{E-bias}*(1.F).$$

Other floating point formats are possible for vector values 602 in other embodiments.

Turning now to FIG. 2B, pseudocode illustrating operation of PFMIN instruction 100 is given. As shown, upon execution of PFMIN instruction 100, a comparison of a first vector portion (such as value 602A) of the value specified by first operand field 102A and a first vector portion of the value second operand 102B is performed. Concurrently, a comparison of a second vector portion (such as value 602B) of the value specified by first operand field 102A and a second vector portion of the value specified by second operand field 102B is also performed.

If the first vector portion of the value specified by first operand field 102A is found to be less than the first vector portion of the value specified by second operand field 102B, the value of the first vector portion of the value specified by first operand field 102A is conveyed as a first portion of a result of instruction 100. Otherwise, the value of the first vector portion of value specified by second operand field 102B is conveyed as the first vector portion of the result of instruction 100. Similarly, if the second vector portion of the value specified by first operand field 102A is found to be less than the second vector portion of the value specified by second operand field 102B, the value of the second vector portion of the value specified by first operand field 102A is conveyed as a second portion of a result of instruction 100. Otherwise, the value of the second vector portion of value specified by second operand field 102B is conveyed as the second vector portion of the result of instruction 100. This sequence of operations effectuates execution of the minimum value function. FIG. 2C is a table which shows the output of instruction 100 given various inputs, including cases in which operands 102 are zero or in unsupported formats.

The result (both the first and second vector portions) of instruction 100 is subsequently written to register mmreg1 within floating point execution unit 36F. In another embodiment of instruction 100, the result value may be stored to mmreg2, a memory location, or a third register specified by an additional operand. It is noted that in other embodiments of instruction 100, the operands are not vectored and thus include only a single value. It is further noted that in still other embodiments of operands 102, these values may include additional vector values beyond the two vector values shown in FIG. 7A.

Turning now to FIG. 3A, the format of a floating point maximum value instruction ("PFMAX") 200 is shown according to one embodiment of the invention. The format of PFMAX instruction 200 is similar to that described above for PFMIN instruction 100. As depicted, PFMAX instruction 200 includes an opcode value 201 and two operands, first operand field 202A and first operand field 202B. The value specified by first operand field 202A is shown as being "mmreg1", which, in one embodiment, is one of the registers on the stack of floating point execution unit 36F. The value specified by second operand field 202B is shown as either being another of the floating point stack registers or a memory location. In another embodiment, second operand field 202B specifies an immediate value.

Turning now to FIG. 3B, pseudocode illustrating operation of PFMAX instruction 200 is given. As shown, upon execution of PFMAX instruction 200, a comparison of a first vector portion (such as value 602A) of the value specified by first operand field 202A and a first vector portion of the value second operand 202B is performed. Concurrently, a comparison of a second vector portion (such as value 602B) of the value specified by first operand field 202A and a second vector portion of the value specified by second operand field 202B is also performed.

If the first vector portion of the value specified by first operand field 202A is found to be greater than the first vector portion of the value specified by second operand field 202B, the value of the first vector portion of the value specified by first operand field 202A is conveyed as a first portion of a result of instruction 200. Otherwise, the value of the first vector portion of value specified by second operand field 202B is conveyed as the first vector portion of the result of instruction 200. Similarly, if the second vector portion of the value specified by first operand field 202A is found to be greater than the second vector portion of the value specified by second operand field 202B, the value of the second vector portion of the value specified by first operand field 202A is conveyed as a second portion of a result of instruction 200. Otherwise, the value of the second vector portion of value specified by second operand field 202B is conveyed as the second vector portion of the result of instruction 200. This sequence of operations effectuates execution of the maximum value function. FIG. 3C is a table which shows the output of instruction 200 given various inputs, including cases in which operands 202 are zero or in unsupported formats.

The result (both the first and second vector portions) of instruction 200 is subsequently written to register mmreg1 within floating point execution unit 36F. In another embodiment of instruction 200, the result value may be stored to mmreg2, a memory location, or a third register specified by an additional operand. It is noted that in other embodiments of instruction 200, the operands are not vectored and thus include only a single value. It is further noted that in still other embodiments of operands 202, these values may include additional vector values beyond the two vector values shown in FIG. 7A.

Turning now to FIG. 4A, the format of a floating point equality compare instruction ("PFCMPEQ") 300 is shown according to one embodiment of the invention. The format of PFCMPEQ instruction 300 is similar to that described above for instructions 100 and 200. As depicted, PFCMPEQ instruction 300 includes an opcode value 301 and two operands, first operand field 302A and first operand field 302B. The value specified by first operand field 302A is shown as being "mmreg1", which, in one embodiment, is one of the registers on the stack of floating point execution unit 36F. The value specified by second operand field 302B is shown as either being another of the floating point stack registers or a memory location. In another embodiment, second operand field 302B specifies an immediate value.

Turning now to FIG. 4B, pseudocode illustrating operation of PFCMPEQ instruction 300 is given. As shown, upon execution of PFCMPEQ instruction 300, a comparison of a first vector portion (such as value 602A) of the value specified by first operand field 302A and a first vector portion of the value second operand 302B is performed. Concurrently, a comparison of a second vector portion (such as value 602B) of the value specified by first operand field 302A and a second vector portion of the value specified by second operand field 302B is also performed.

If the first vector portion of the value specified by first operand field 302A is found to be equal to the first vector portion of the value specified by second operand field 302B, the value of the first vector portion of the value specified by first operand field 302A is conveyed as a first portion of a result of instruction 300. Otherwise, the value of the first vector portion of value specified by second operand field 302B is conveyed as the first vector portion of the result of instruction 300. Similarly, if the second vector portion of the value specified by first operand field 302A is found to be equal to the second vector portion of the value specified by second operand field 302B, the value of the second vector portion of the value specified by first operand field 302A is conveyed as a second portion of a result of instruction 300. Otherwise, the value of the second vector portion of value specified by second operand field 302B is conveyed as the second vector portion of the result of instruction 300. This sequence of operations effectuates execution of the equality compare function. FIG. 4C is a table which shows the output of instruction 300 given various inputs, including cases in which operands 302 are zero or in unsupported formats.

The result (both the first and second vector portions) of instruction 300 is subsequently written to register mmreg1 within floating point execution unit 36F. In another embodiment of instruction 300, the result value may be stored to mmreg2, a memory location, or a third register specified by an additional operand. It is noted that in other embodiments of instruction 300, the operands are not vectored and thus include only a single value. It is further noted that in still other embodiments of operands 302, these values may include additional vector values beyond the two vector values shown in FIG. 7A.

Turning now to FIG. 5A, the format of a floating point greater than compare instruction ("PFCMPGT") 400 is shown according to one embodiment of the invention. The format of PFCMPGT instruction 400 is similar to that described above for instructions 100, 200, and 300. As depicted, PFCMPGT instruction 400 includes an opcode value 401 and two operands, first operand field 402A and first operand field 402B. The value specified by first operand field 402A is shown as being "mmreg1", which, in one embodiment, is one of the registers on the stack of floating point execution unit 36F. The value specified by second operand field 402B is shown as either being another of the floating point stack registers or a memory location. In another embodiment, second operand field 402B specifies an immediate value.

Turning now to FIG. 5B, pseudocode illustrating operation of PFCMPGT instruction 400 is given. As shown, upon execution of PFCMPGT instruction 400, a comparison of a first vector portion (such as value 602A) of the value specified by first operand field 402A and a first vector portion of the value second operand 402B is performed. Concurrently, a comparison of a second vector portion (such as value 602B) of the value specified by first operand field 402A and a second vector portion of the value specified by second operand field 402B is also performed.

If the first vector portion of the value specified by first operand field 402A is found to be greater than the first vector portion of the value specified by second operand field 402B, the value of the first vector portion of the value specified by first operand field 402A is conveyed as a first portion of a result of instruction 400. Otherwise, the value of the first vector portion of value specified by second operand field 402B is conveyed as the first vector portion of the result of instruction 400. Similarly, if the second vector portion of the value specified by first operand field 402A is found to be greater than the second vector portion of the value specified by second operand field 402B, the value of the second vector portion of the value specified by first operand field 402A is conveyed as a second portion of a result of instruction 400. Otherwise, the value of the second vector portion of value specified by second operand field 402B is conveyed as the second vector portion of the result of instruction 400. This sequence of operations effectuates execution of the greater than compare function. FIG. 5C is a table which shows the output of instruction 400 given various inputs, including cases in which operands 402 are zero or in unsupported formats.

The result (both the first and second vector portions) of instruction 400 is subsequently written to register mmreg1 within floating point execution unit 36F. In another embodiment of instruction 400, the result value may be stored to mmreg2, a memory location, or a third register specified by an additional operand. It is noted that in other embodiments of instruction 400, the operands are not vectored and thus include only a single value. It is further noted that in still other embodiments of operands 402, these values may include additional vector values beyond the two vector values shown in FIG. 7A.

Turning now to FIG. 6A, the format of a floating point greater than or equal to compare instruction ("PFCMPGE") 500 is shown according to one embodiment of the invention. The format of PFCMPGE instruction 500 is similar to that described above for instructions 100, 200, 300, and 400. As depicted, PFCMPGE instruction 500 includes an opcode value 401 and two operand fields, first operand field 502A and first operand field 502B. The value specified by first operand field 502A is shown as being "mmreg1", which, in one embodiment, is one of the registers on the stack of floating point execution unit 36F. The value specified by second operand field 502B is shown as either being another of the floating point stack registers or a memory location. In another embodiment, second operand field 502B specifies an immediate value.

Turning now to FIG. 6B, pseudocode illustrating operation of PFCMPGE instruction 500 is given. As shown, upon execution of PFCMPGE instruction 500, a comparison of a first vector portion (such as value 602A) of the value specified by first operand field 502A and a first vector portion of the value second operand 502B is performed. Concurrently, a comparison of a second vector portion (such as value 602B) of the value specified by first operand field 502A and a second vector portion of the value specified by second operand field 502B is also performed.

If the first vector portion of the value specified by first operand field 502A is found to be greater than or equal to the first vector portion of the value specified by second operand field 502B, the value of the first vector portion of the value specified by first operand field 502A is conveyed as a first portion of a result of instruction 500. Otherwise, the value of the first vector portion of value specified by second operand field 502B is conveyed as the first vector portion of the result of instruction 500. Similarly, if the second vector portion of the value specified by first operand field 502A is found to be greater than the second vector portion of the value specified by second operand field 502B, the value of the second vector portion of the value specified by first operand field 502A is conveyed as a second portion of a result of instruction 500. Otherwise, the value of the second vector portion of value specified by second operand field 502B is conveyed as the second vector portion of the result of instruction 500. This sequence of operations effectuates execution of the greater than or equal to compare function. FIG. 6C is a table which shows the output of instruction 500 given various inputs, including cases in which operands 402 are zero or in unsupported formats.

The result (both the first and second vector portions) of instruction 500 is subsequently written to register mmreg1 within floating point execution unit 36F. In another embodiment of instruction 500, the result value may be stored to mmreg2, a memory location, or a third register specified by an additional operand. It is noted that in other embodiments of instruction 500, the operands are not vectored and thus include only a single value. It is further noted that in still other embodiments of operands 502, these values may include additional vector values beyond the two vector values shown in FIG. 7A.

It is noted that various other extreme value and compare instructions may be implemented in other embodiments.

Figure 8:
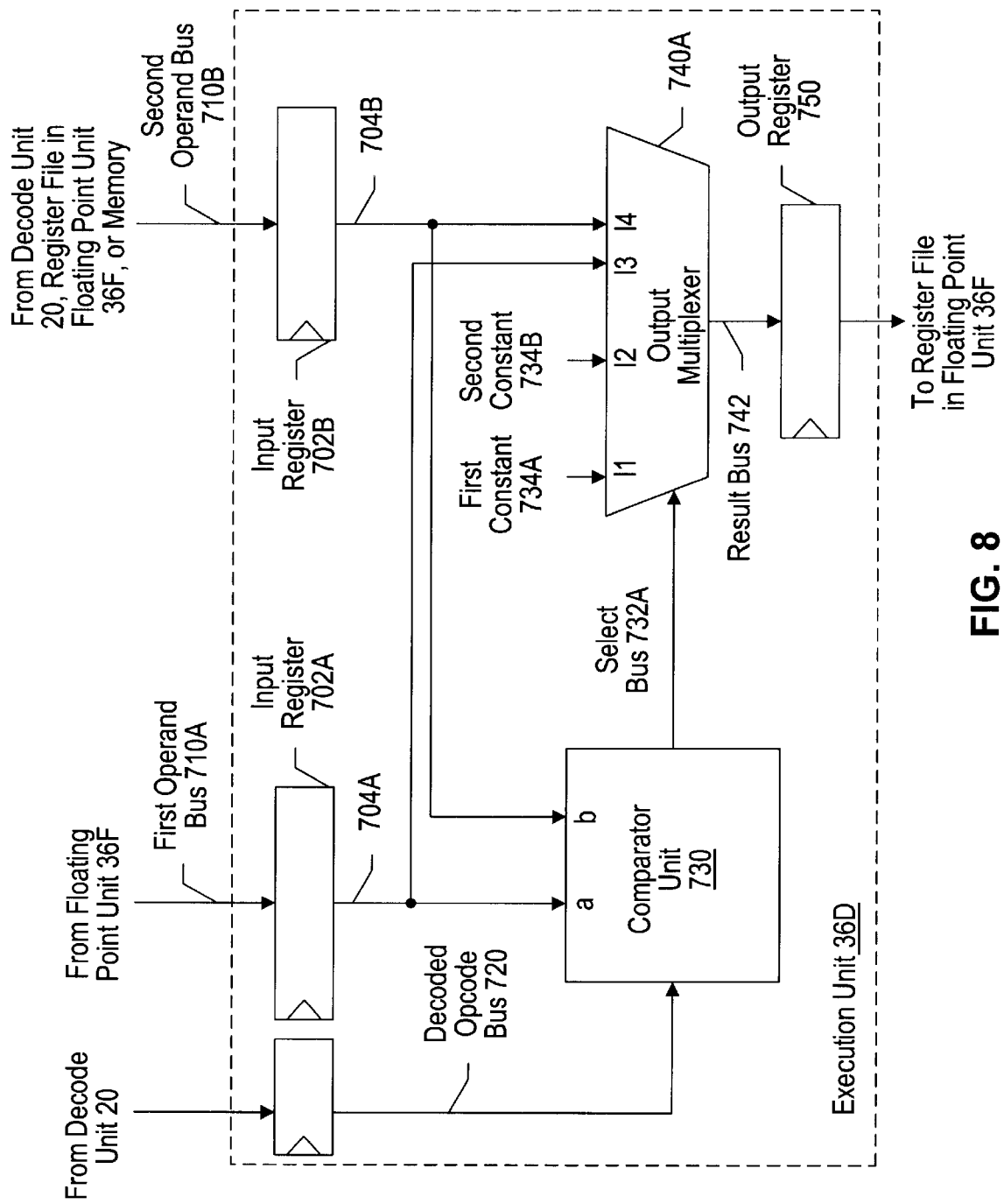
FIG. 8 is a block diagram of an execution unit configured to execute the instructions depicted in FIGS. 2–6 according to one embodiment of the invention.

Turning now to FIG. 8, a block diagram of multimedia execution unit 36D is shown according to one embodiment of the invention. As depicted, execution unit 36D includes input registers 702A and 702B. Register 702A is coupled to floating point unit 36F by a first operand bus 710A. Likewise, register 702B is coupled to floating point unit 36F by a second operand bus 710B. Second operand bus 710B also couples input register 702B to receive operands via decode unit 20 and memory in one embodiment. Execution unit 36D further includes a comparator unit 730, which is coupled to receive decoded opcode values on decoded opcode bus 720 from decode unit 20. Comparator unit is further coupled to receive compare inputs (labeled "a" and "b") from register output buses 704A–B, coupled to the outputs of registers 702A and 702B, respectively. Comparator unit 730 conveys a select bus 732A as output.

Select bus 732A is coupled to output multiplexer 740A in order to select one of the inputs to multiplexer 740A as an output on result bus 742. The inputs to multiplexer 740A include a first constant value 734A, a second constant value 734B, and register output buses 704A and 704B. The output of multiplexer 740A is stored in an output register 750, and subsequently forwarded to a result destination, such as a floating point register within execution unit 36F.

Decoded versions of opcodes recognized by microprocessor 10 are conveyed from decode unit 20 to comparator unit 730 on decoded opcode bus 720. If the value on bus 720 is an opcode that corresponds to an extreme value function or a compare function (i.e., opcodes such as opcode 101, opcode 201, etc.), comparator unit is configured to assert signals on select bus 732A during the current clock cycle. These signals are used to select the output of multiplexer 740A as described below. If the value on bus 720 does not correspond to an extreme value function or compare function, comparator unit is inactive for the current clock cycle.

Concurrently with decoded opcode values being conveyed to execution unit 36D, first and second operands are conveyed to unit 36D on buses 710A and 710B, respectively. As depicted, the first operand is conveyed to an input register 702A on bus 710A. The first operand is selected according to a value of the first operand field as shown above. For example, the value of the first operand field as stored in instruction cache 14 may specify a particular register location. Subsequent logic in decode unit 20 and instruction control logic 34 is responsible for forwarding the value stored in the particular register location on bus 710A. The second operand of the instruction is conveyed similarly on bus 710B and stored in register 702B. In the embodiment shown in FIG. 8, the operands stored in registers 702 are non-vectored; that is, they each contain only a single independent value. An execution unit which processes vectored operands is described below with reference to FIG. 9.

In the same clock cycle that the decoded opcode value is provided to comparator unit 730 on decoded opcode bus 720, the first and second operands are also conveyed as compare inputs to unit 730 on buses 704A–B. Comparator unit performs a comparison of the two operands, and, according to the decoded opcode value on bus 720, conveys values on bus 732A which select one of the inputs to multiplexer 740A. The inputs to multiplexer 740A include first constant value 734A, second constant value 734B, and the values of the first and second operands on buses 704A–B. These inputs are labeled as "I1"-"I4" in FIG. 8.

If the decoded opcode value indicates a compare operation, the values on select bus 732A select between constants 734 according to the result of the compare operation. These constants may be any value that is useful to have written to a register the result of a compare. On the other hand, if the decoded opcode value indicates a extreme value function (minimum or maximum value), the values on select bus 732A select between the operand values on buses 704 according to the results of the compare. The particular inputs selected from multiplexer 740A are shown in Table 1 for the various compare results and the instructions described above.

TABLE 1

| Opcode | Compare a > b | Results a = b | a < b |
|---|---|---|---|
| PFMIN | I4 | I4 | I3 |
| PFMAX | I3 | I4 | I4 |
| PFCMPEQ | I2 | I1 | I2 |
| PFCMPGT | I1 | I2 | I2 |
| PFCMPGE | I1 | I1 | I2 |

The output of multiplexer 740A is conveyed on result bus 742 to an output register 750 as the result of the instruction corresponding to the decoded opcode value received on bus 720. This result may be forwarded to a variety of destinations. As described above with reference to instructions 100, 200, 300, 400, and 500, the result of the instruction is written to the register location in floating point unit 36F which stores the first operand. In other embodiments, the result may be written to a different register specified by an additional operand value.

Figure 9:
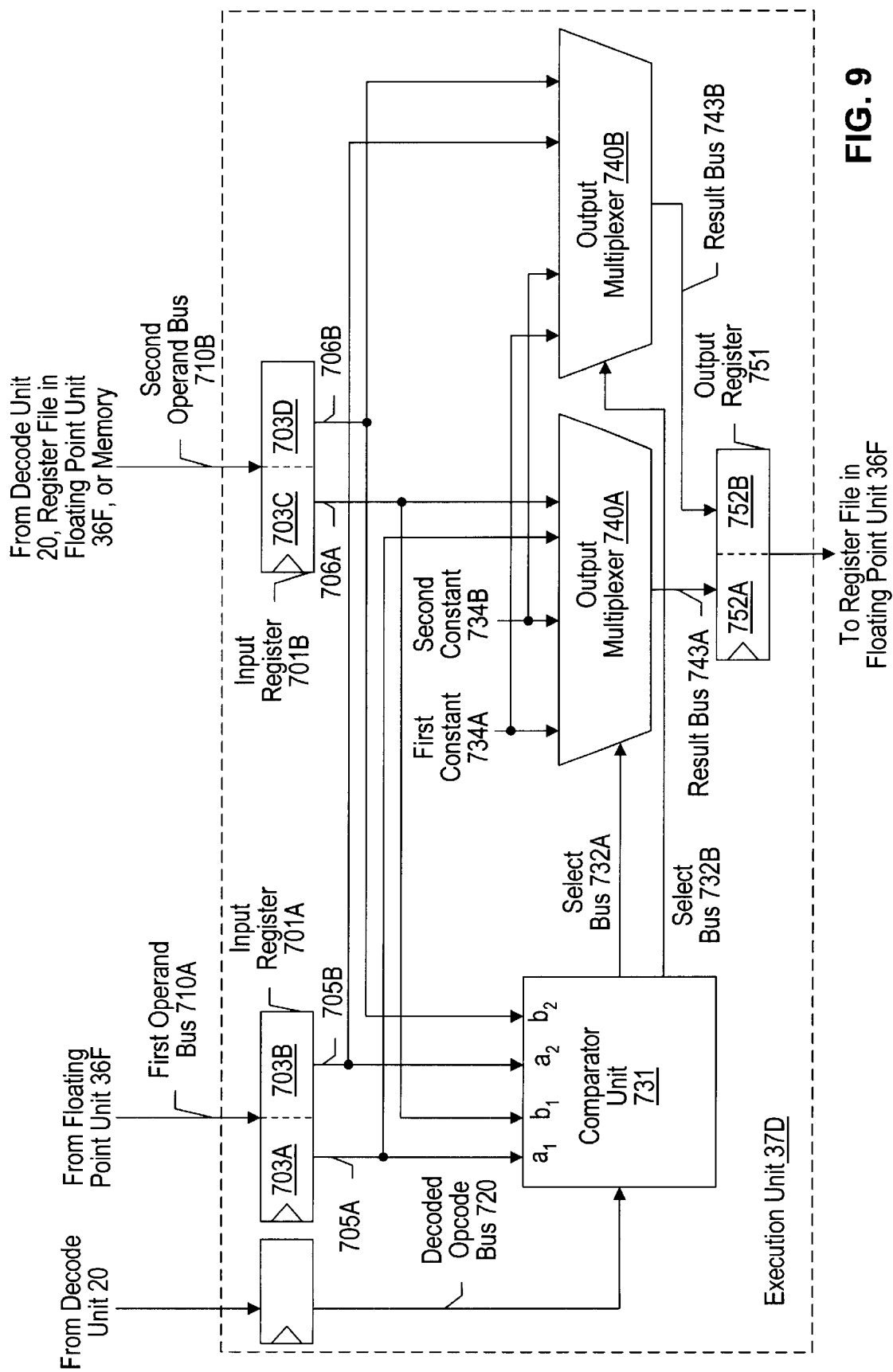
FIG. 9 is a block diagram of a vector execution unit configured to execute the instructions depicted in FIGS. 2–6 according to one embodiment of the invention.

Turning now to FIG. 9, a multimedia execution unit 37D is shown. Execution unit 37D is similar in structure to execution unit 36D; therefore, logic blocks and buses in execution unit 37D which operate similarly to those in FIG. 8 are numbered identically for convenience and clarity. Unlike execution unit 36D, however, unit 37D is configured to efficiently process vector operands. Execution unit 37D is interchangeable with execution unit 36D within the context of microprocessor 10 shown in FIG. 1.

As depicted, execution unit 37D includes input registers 701A and 701B. Register 701A is coupled to floating point unit 36F by a first operand bus 710A. Likewise, register 702B is coupled to floating point unit 36F by a second operand bus 710B. Second operand bus 710B also couples input register 701B to receive operands via decode unit 20 and memory in one embodiment. Unlike input registers 702 shown in FIG. 8, input register 701 are vectored. As shown, register 701A includes a first vector portion 703A and a second vector portion 703B. Likewise, register 701B includes a first vector portion 703C and a second vector portion 703D. Execution unit 37D further includes a comparator unit 731, which is similar to comparator unit 730 shown in FIG. 8 in that comparator unit 731 also receives a decode opcode value on bus 720. Comparator unit 731, however, is configured to perform two comparisons and convey two sets of select bus signals concurrently. Unit 731 receives a first set of signals (at inputs labeled "$a_1$" and "$b_1$") which correspond to first vector portions 703A and 703C, as well as a second set of signals (at inputs labeled "a2" and "b2") which correspond to second vector portions 703B and 703D. In response to the comparison performed for inputs $a_1$, and $b_1$, comparator unit 731 conveys select bus 732A as output to multiplexer 740A. Similarly, comparator 731 conveys values on a select bus 732B to multiplexer 740B in response to the comparison performed for the inputs labeled $a_2$ and $b_2$.

Select bus 732A is coupled to output multiplexer 740A in order to select one of the inputs to multiplexer 740A as an output on result bus 743A. The inputs to multiplexer 740A include first constant value 734A, second constant value 734B, and first vector portions 703A and 703C. The output of multiplexer 740A is conveyed on a result bus 743A to be stored in a first vector portion 752A of an output register 751.

Similarly, select bus 732B is coupled to an output multiplexer 740B in order to select a multiplexer 740B input for output. Inputs to multiplexer 740B include constant values 734, and second vector portions 703B and 703D. The selected output of multiplexer 740B is conveyed on a result bus 743B to be stored in a second vector portion 752B of output register 751.

The first and second vector portions of register 751 are subsequently forwarded to a result destination, such as a floating point register within execution unit 36F.

Extreme value instructions 100 and 200 are efficiently implemented in microprocessor 10. By modifying comparator and multiplexer hardware used for compare operations, minimum and maximum value instructions 100 and 200 may be added to the instruction set of microprocessor 10 with minimal overhead. The performance of microprocessor 10 in applications which commonly use these extreme value functions is thus advantageously increased.

Numerous variations and modifications will become apparent to those skilled in the art once the above disclosure is fully appreciated. It is intended that the following claims be interpreted to embrace all such variations and modifications.

What is claimed is:

1. A microprocessor configured to execute a first instruction, wherein an encoded representation of said first instruction includes an opcode field specifying an extreme value operation, a first operand field, and a second operand field, said microprocessor comprising:

a decode unit configured to decode said encoded representation of said first instruction; and an execution unit coupled to receive a decoded form of said first instruction from said decode unit, a first operand identified by a value of said first operand field, and a second operand identified by a value of said second operand field, wherein said execution unit includes a comparator configured to compare said first and second operands, wherein in response to receiving said decoded form of said first instruction the execution unit is configured to output an extreme value equaling either the first operand or the second operand based on an output of the comparator and a type of extreme value operation specified by the decoded form of the first instruction;

wherein the extreme value output by the execution unit is stored in a destination register specified in the encoded representation of the first instruction as a result of execution of the first instruction.

2. The microprocessor of claim 1, wherein said extreme value operation is a minimum value operation, and wherein said comparator is configured to determine which of said first and second operands has a lesser value in response to said execution unit receiving said decoded form of said first instruction, and wherein said execution unit is configured to output said lesser value as said extreme value.

3. The microprocessor of claim 1, wherein said extreme value operation is a maximum value operation, and wherein said comparator is configured to determine which of said first and second operands has a greater value in response to said execution unit receiving said decoded form of said first instruction, and wherein said execution unit is configured to output said greater value as said extreme value.

4. The microprocessor of claim 1, further comprising a register file which includes a first register, wherein said first register stores said first operand, and wherein said value of said first operand field specifies said first register, and wherein said register file is configured to convey said first operand to said execution unit.

5. The microprocessor of claim 4, wherein said execution unit is further configured to convey said value corresponding to the first operand and said value corresponding to the second operand to said register file, wherein the encoded representation of the first instruction specifies the first register as the destination register, and wherein said register file is configured to store said extreme value as a new value of said first register.

6. The microprocessor of claim 5, wherein said register file further includes a second register which stores said second operand, and wherein said value of said second operand field specifies said second register.

7. The microprocessor of claim 5, wherein said extreme value operation is a minimum value operation, and wherein said comparator is configured to determine which of said first and second operands has a lesser value in response to said execution unit receiving said decoded form of said first instruction, and wherein said execution unit is configured to output said lesser value as said extreme value.

8. The microprocessor of claim 5, wherein said execution unit is further configured to convey said value corresponding to the first operand and said value corresponding to the second operand to said register file, and wherein said register file is configured to store said extreme value as a new value of said first register.

9. The microprocessor of claim 8, wherein said register file further includes a second register which stores said second operand, and wherein said value of said second operand field specifies said second register.

10. The microprocessor of claim 4, further comprising a memory unit which includes a first memory location, wherein said first memory location stores said second operand, and wherein said value of said second operand specifies said first memory location.

11. The microprocessor of claim 4, wherein said extreme value operation is a maximum value operation, and wherein said comparator is configured to determine which of said first and second operands has a greater value in response to said execution unit receiving said decoded form of said first instruction, and wherein said execution unit is configured to output said greater value as said extreme value.

12. The microprocessor of claim 11, further comprising a memory unit which includes a first memory location, wherein said first memory location stores said second operand, and wherein said value of said second operand specifies said first memory location.

13. The microprocessor of claim 1, wherein said first operand and second operand are floating point numbers.

14. The microprocessor as recited in claim 1 wherein said execution unit is configured to store said result in a software accessible register.

15. The microprocessor of claim 14, wherein said extreme value operation is a minimum value operation, and wherein said comparator is configured to determine which of said first and second operands has a lesser value in response to said execution unit receiving said decoded form of said first instruction, and wherein said execution unit is configured to output said lesser value as said extreme value.

16. The microprocessor of claim 14, wherein said extreme value operation is a maximum value operation, and wherein said comparator is configured to determine which of said first and second operands has a greater value in response to said execution unit receiving said decoded form of said first instruction, and wherein said execution unit is configured to output said greater value as said extreme value.

17. The microprocessor of claim 1, wherein said first operand includes a first vector value followed by a second vector value, and wherein said second operand includes a third vector value followed by a fourth vector value, and wherein said execution unit is configured to perform said extreme value operation on said first vectors value and said third vector value, thereby generating a first vector portion of said output value conveyed as a result of said first instruction.

18. The microprocessor of claim 17, wherein said execution unit is configured to perform said extreme value operation on said second vector value and said fourth vector value, thereby generating a second vector portion of said output value conveyed as a result of said first instruction, wherein generation of said first vector portion is performed concurrently with generation of said second vector portion.

19. The microprocessor of claim 1, wherein the decode unit is further configured to decode an encoded second instruction, wherein the encoded representation of the second instruction includes a second opcode field specifying a compare operation, a third operand field, and a fourth operand field;

wherein the execution unit is further coupled to receive a decoded form of said second instruction from said decode unit, a third operand identified by a value of said third operand field, and a fourth operand identified by a value of said fourth operand field;

wherein the comparator is further configured to compare said third and fourth operands; and wherein in response to receiving said decoded form of said first instruction, the execution unit is configured to output either a first constant value or a second constant value based on an output of the comparator and a type of compare operation specified by the decoded form of the first instruction.

20. The microprocessor of claim 1, wherein the destination register is specified by the first operand field of the encoded representation of the first instruction.

* * * * *